United States Patent
Kim et al.

(10) Patent No.: US 11,055,663 B2
(45) Date of Patent: Jul. 6, 2021

(54) SYSTEMS AND METHODS FOR SCHEDULING INBOUND PRODUCTS, STOWING INBOUND PRODUCTS, AND MONITORING INBOUND ERROR

(71) Applicant: Coupang Corp., Seoul (KR)

(72) Inventors: Jae Hyun Kim, Seoul (KR); Kyungtae Kang, Seoul (KR); Sun Young Hong, Seoul (KR); Woojung Park, Hanam (KR); Gyoungseok Lee, Seongnam (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/737,380

(22) Filed: Jan. 8, 2020

(65) Prior Publication Data
US 2021/0027243 A1 Jan. 28, 2021

Related U.S. Application Data

(63) Continuation of application No. 16/518,308, filed on Jul. 22, 2019, now Pat. No. 10,565,555.

(51) Int. Cl.
*G06Q 10/08* (2012.01)
*G06K 7/14* (2006.01)
(Continued)

(52) U.S. Cl.
CPC ......... *G06Q 10/0875* (2013.01); *G06F 16/23* (2019.01); *G06K 7/1413* (2013.01); *G06Q 10/08* (2013.01); *G06Q 50/28* (2013.01)

(58) Field of Classification Search
CPC ....... G06Q 10/08; G06Q 10/087; G06Q 50/28
See application file for complete search history.

(56) References Cited

U.S. PATENT DOCUMENTS 9,382,068 B1 * 7/2016 Quan .................. G06Q 10/083
10,074,071 B1 * 9/2018 Engdahl .............. G06Q 10/083
(Continued)

FOREIGN PATENT DOCUMENTS

JP        2016-529178      9/2016
KR    2003-0056692      7/2003
(Continued)

OTHER PUBLICATIONS

International Search Report in PCT/IB2020/056170, dated Jun. 30, 2020 (3 pages).
(Continued)

*Primary Examiner* — A. Hunter Wilder
(74) *Attorney, Agent, or Firm* — Finnegan, Henderson, Farabow, Garrett & Dunner LLP

(57) ABSTRACT

The present disclosure provides systems and methods for receiving inbound products, comprising a memory and a processor configured to schedule a delivery of an inbound pallet based on a predetermined priority rule, receive at least one of a waybill number, a reservation number, or a purchase order number associated with the inbound pallet containing a product, and modify a database to assign an inbound barcode and at least one of the waybill number, the reservation number, or the purchase order number to the inbound pallet, receive at least one of the inbound barcode or a product identifier associated with the product, predict a zone for stowing the product, receive a tote identifier associated with a tote containing the product, and modify the database to assign the product identifier associated with the product and the tote identifier to the zone.

20 Claims, 15 Drawing Sheets

| Purchase Order Number | Name of Product | Priority Level | Product Identifier |
|---|---|---|---|
| ● 1914220 | Toothpaste Dispenser | High | 266485 |
|  | Triangular Nightstand | High | 266841 |
|  | Children's Book | Medium | 125789 |
|  | Lotion | Medium | 895123 |
| ◉ 1914221 | Lotion | Medium | 385795 |
|  | Socks | Low | 499565 |
|  | Calendar | Low | 057963 |

400

(51) Int. Cl.
  *G06F 16/23*    (2019.01)
  *G06Q 50/28*    (2012.01)

(56) References Cited

U.S. PATENT DOCUMENTS

| | | | |
|---|---|---|---|
| 10,579,956 B1* | 3/2020 | Thakkar | G06Q 10/0838 |
| 2009/0234493 A1 | 9/2009 | Pandit et al. | |
| 2014/0297555 A1 | 10/2014 | Kawano et al. | |
| 2015/0073587 A1 | 3/2015 | Vliet et al. | |
| 2017/0132551 A1* | 5/2017 | Shields | G06Q 50/28 |
| 2018/0060619 A1 | 3/2018 | Bathurst | |
| 2018/0268348 A1* | 9/2018 | Guan | G06Q 10/083 |
| 2018/0293543 A1 | 10/2018 | Tiwari | |
| 2020/0134699 A1* | 4/2020 | Morozov | G06Q 30/0641 |

FOREIGN PATENT DOCUMENTS

| | | |
|---|---|---|
| KR | 10-2015-0089793 | 8/2015 |
| KR | 10-1953069 | 2/2019 |
| KR | 10-1953069 B1 | 2/2019 |
| KR | 10-1974312 | 4/2019 |

OTHER PUBLICATIONS

Written Opinion of the International Searching Authority in PCT/IB2020/056170, dated Oct. 6, 2020 (5 pages).

Notice of Preliminary Rejection dated Nov. 24, 2020, by the Korean Patent Office in Korean Application No. 10-2019-0108989, 18 pages.

* cited by examiner

FIG. 1C

| Waybill Number 401 | Reservation Number 402 | Purchase Order Number 403 |

404

Waybill Number: 9383154885
Reservation Number: 285544561001
Purchase Order Number: ● 1914220  ○ 1914221  ○ 1914222

[List of Products] 407

| Save and End 405 | Submit 406 |

| Purchase Order Number | Name of Product | Priority Level | Product Identifier |
|---|---|---|---|
| ● 1914220 | Toothpaste Dispenser | High | 266485 |
| | Triangular Nightstand | High | 266841 |
| | Children's Book | Medium | 125789 |
| | Lotion | Medium | 895123 |
| ○ 1914221 | Lotion | Medium | 385795 |
| | Socks | Low | 499565 |
| | Calendar | Low | 057963 |

Database 304

| Inbound Barcode 501 | Reservation Number 402 | Waybill Number 401 | Manufacturer 502 | Expected Delivery Date 503 | Timestamp 504 | Number of Pallets 505 | Number of Boxes 506 |
|---|---|---|---|---|---|---|---|
| 12455 | 285544561001 | 9383154885 | ABCDE | 2018-04-14 10:00:00 | 2018-04-14 10:05:00 | 1 | 1 |
| 13467 | 282548561001 | 1358441036 | XSDFE | 2018-04-28 9:00:00 | 2018-04-28 8:00:00 | 1 | 1 |
| 55599 | 285502575001 | 1358945423 | SDFEE | 2018-04-29 11:00:00 | 2018-04-30 10:00:00 | 1 | 1 |
| 02457 | 789223661001 | 5648776033 | SDFSE | 2018-05-01 15:00:00 | 2018-05-01 15:30:20 | 1 | 1 |
| 68425 | 648522661001 | 6547449623 | EFGZS | 2018-05-01 16:00:00 | 2018-05-01 16:00:00 | 1 | 1 |
| 18745 | 548826661001 | 5568988324 | WEBCW | 2018-05-02 9:00:00 | 2018-05-02 9:40:00 | 1 | 1 |
| 02589 | 285544148841 | 1246088589 | LKJOIK | 2018-05-04 8:00:00 | 2018-05-05 15:00:00 | 1 | 1 |
| 65485 | 285489425471 | 4682306415 | CIWKES | 2018-05-05 17:00:00 | 2018-05-05 9:00:00 | 1 | ⋮ |
| ⋮ | ⋮ | ⋮ | ⋮ | ⋮ | ⋮ | ⋮ | ⋮ |

FIG. 5

Database 304

| Number | Inbound Error Barcode 622 | Status 701 | Inbound Barcode 601 | Waybill Number 401 | Product Identifier 620 | Quantity 621 | ... |
|---|---|---|---|---|---|---|---|
| 1 | IPR125456 | Reported | 12455 | 9383154885 | 266485 | 1 | ... |
| 2 | IPR132684 | Reported | 13467 | 1358441036 | 165498 | 1 | ... |
| 3 | IPR895233 | Reported | 55599 | 1358945423 | 492155 | 1 | ... |
| 4 | IPR159854 | Reported | 02457 | 5648776033 | 058795 | 1 | ... |
| 5 | IPR026876 | Reported | 68425 | 6547449623 | 158796 | 333 | ... |
| 6 | IPR098746 | Resolved | 18745 | 5568988324 | 185795 | 33 | ... |
| 7 | IPR761315 | Reported | 02589 | 1246088589 | 789546 | 1 | ... |
| 8 | IPR167953 | Resolved | 65485 | 4682306415 | 946842 | 2 | ... |
| ... | ... | ... | ... | ... | ... | ... | ... |

FIG. 7

SYSTEMS AND METHODS FOR SCHEDULING INBOUND PRODUCTS, STOWING INBOUND PRODUCTS, AND MONITORING INBOUND ERROR

CROSS-REFERENCE TO RELATED APPLICATIONS

This application is a continuation of U.S. patent application Ser. No. 16/518,308, filed on Jul. 22, 2019, the disclosure of which is hereby incorporated by reference in its entirety.

TECHNICAL FIELD

The present disclosure generally relates to computerized systems and methods for receiving inbound products, stowing inbound products, and monitoring inbound error. In particular, embodiments of the present disclosure relate to inventive and unconventional systems related to receiving products by scheduling a delivery of inbound products based on a predetermined priority rule, stowing inbound products by predicting a zone for stowing based on a parameter associated with a product identifier, and monitoring inbound error by modifying a database to assign an inbound error barcode to the product identifier.

BACKGROUND

Various systems and methods exist for receiving stowing inbound products and reporting any errors that may arise while receiving and stowing the inbound products. For example, as inbound products arrive at fulfillment centers, workers manually scan identifiers associated with the products, such as stocking keeping units (SKUs) and manually fill out reports for each inbound error, such as a barcode error, a waybill error, a vendor error, a shipment error, or the like. Then, the workers gather the inbound products with errors and deliver these products back to the vendors and/or suppliers for reshipment. While these conventional systems and methods may be effective in reporting inbound errors, there has yet to be an efficient method for receiving inbound products that efficiently schedules deliveries of inbound products based on a predetermined priority rule. In addition, there has yet to be an efficient method for monitoring inbound errors that assigns an inbound error barcode to the products with inbound errors that map to the inbound error such that a worker may determine information associated with the inbound error by scanning the inbound error barcode.

Errors that arise while receiving inbound products can significantly delay the shipment and delivery of products to customers. As one example, workers may make mistakes in calculating the quantity of inbound products and, as such, the physical quantity of a certain product may be different from the expected quantity of the product. Moreover, inbound errors may also arise at the vendors and/or suppliers. For example, the vendors and/or suppliers may make mistakes when sending inbound products to fulfillment centers. For example, vendors and/or suppliers may send less than an expected quantity of a certain product or vendors and/or suppliers may send the wrong products (e.g., products not specified in the waybill) to the fulfillment centers. Furthermore, delivery of inbound products may be scheduled in an organized manner. As such, there may be a simultaneous influx of inbound product deliveries in the morning and almost no inbound product delivery in the afternoon. If there are not enough workers to receive inbound product deliveries in the morning, this can significantly delay the shipment and delivery of products to customers. Since errors that arise while receiving deliveries of inbound products are inevitable, there is a need for improved systems and methods for receiving inbound products that schedules deliveries of inbound products intelligently and that reports inbound errors quickly and efficiently in order to reduce delays in shipment and delivery of products to customers.

In addition, conventional systems and methods for stowing inbound products stow products in fixed locations within a fulfillment center. For example, conventional systems and methods may be configured to designate different types of products to a predetermined location within the fulfillment center for stowing. Furthermore, based on certain restriction rules, conventional systems and methods may determine a location within the fulfillment center for stowing products. By way of example, based on the restrictions rules, all products with the same SKU may need to be placed in a fixed location within the fulfillment center, and all products with the same expiration date may need to be placed in another fixed location within the fulfillment center. While providing a fixed location for stowing each product may be helpful in organizing the inbound products within the fulfillment center, this may significantly delay the shipment and delivery of products to customers. Especially for large companies, fulfillment centers and warehouses may be extremely large, and thus, it may take increase the time it takes to stow each product in its fixed location within the fulfillment center.

Therefore, there is a need for improved systems and methods for stowing products. In particular, there is a need for improved systems and methods for stowing products that is capable of predicting a zone within the fulfillment center for stowing inbound products when an identifier is scanned. In addition, there is a need for improved systems and methods for stowing inbound product that predicts the zone for stowing based on one or more parameters associated with the scanned identifier.

SUMMARY

One aspect of the present disclosure is directed to a computer-implemented system for receiving inbound products. The system may comprise a memory storing instructions and at least one processor configured to execute the instructions. The at least one processor may be configured to execute the instructions to schedule a delivery of an inbound pallet based on a predetermined priority rule, receive at least one of a waybill number, a reservation number, or a purchase order number associated with the inbound pallet containing at least one product, modify a database to assign an inbound barcode and at least one of the waybill number, the reservation number, or the purchase order number to the inbound pallet, receive at least one of the inbound barcode or a product identifier associated with the at least one product for stowing the at least one product, predict, after receiving at least one of the received inbound barcode or the product identifier, a zone for stowing the at least one product and a stowing capacity of the zone, receive a tote identifier associated with a tote containing the at least one product for stowing in the zone, and modify the database to assign the product identifier associated with the at least one product and the tote identifier to the zone. In some embodiments, the prediction may be based on a parameter associated with the product identifier.

In some embodiments, the parameter associated with the product identifier may comprise at least one of a priority level of the product identifier, a dimension of the at least one product associated with the product identifier, a weight of the at least one product associated with the product identifier, or an expiration date of the at least one product associated with the product identifier. The priority level of the product identifier may include a first priority level, a second priority level, and a third priority level. When the product identifier is associated with the first priority level, the at least one processor may be configured to provide a notification to a user device to stow the at least one product within a predetermined number of hours from receiving the at least one product. When the product identifier is associated with the second priority level, the at least one processor may be configured to provide a notification to a user device to stow the at least one product within one day from receiving the at least one product. When the product identifier is associated with the third priority level, the at least one processor may be configured to provide a notification to a user device to stow the at least one product within a predetermined number of days from receiving the at least one product.

In some embodiments, the at least one processor may be further configured to execute the instructions to modify the database to assign an expected delivery date and a timestamp of the inbound pallet. In some embodiments, the at least one processor may be further configured to execute the instructions to receive, from a user device, a report of an inbound error associated with at least one product, receive an inbound error barcode mapped to the inbound error, and modify the database to assign the inbound error barcode to at least one of the inbound barcode or the product identifier. The inbound error barcode may be mapped to the inbound error such that, when the inbound error barcode is scanned, the at least one processor may be configured to display, on the user device, a cause of the inbound error. In some embodiments, the cause of the inbound error may comprise at least one of a product image error, a barcode error, an expiration date error, a waybill error, a vendor error, a worker error, or a shipment error.

In some embodiments, scheduling inbound deliveries based on the predetermined priority rule may comprise scheduling inbound deliveries based on a type of delivery and a priority level associated with the type of delivery. In some embodiments, the type of delivery may include a first, second, and third types of delivery. A priority level associated with the first type of delivery may be greater than a priority level associated with the second type of delivery, and the priority level associated with the second type of delivery may be greater than a priority level associated with the third type of delivery.

Another aspect of the present disclosure is directed to a computer-implemented method for receiving inbound products. The method may comprise scheduling a delivery of an inbound pallet based on a predetermined priority rule, receiving at least one of a waybill number, a reservation number, or a purchase order number associated with the inbound pallet containing at least one product, modifying a database to assign an inbound barcode and at least one of the waybill number, the reservation number, or the purchase order number to the inbound pallet, receiving at least one of the inbound barcode or a product identifier associated with the at least one product for stowing the at least one product, predicting, after receiving at least one of the received inbound barcode or the product identifier, a zone for stowing the at least one product and a stowing capacity of the zone, receiving a tote identifier associated with a tote containing the at least one product for stowing in the zone, and modifying the database to assign the product identifier associated with the at least one product and the tote identifier to the zone. In some embodiments, the prediction may be based on a parameter associated with the product identifier.

In some embodiments, the parameter associated with the product identifier may comprise at least one of a priority level of the product identifier, a dimension of the at least one product associated with the product identifier, a weight of the at least one product associated with the product identifier, or an expiration date of the at least one product associated with the product identifier. The priority level of the product identifier may include a first priority level, a second priority level, and a third priority level. In some embodiments, the method may comprise providing a notification to a user device to stow the at least one product within a predetermined number of hours from receiving the at least one product, when the product identifier is associated with the first priority level, providing a notification to a user device to stow the at least one product within one day from receiving the at least one product, when the product identifier is associated with the second priority level, and providing a notification to a user device to stow the at least one product within a predetermined number of days from receiving the at least one product, when the product identifier is associated with the third priority level.

In some embodiments, the method may further comprise modifying the database to assign an expected delivery date and a timestamp of the inbound pallet. In some embodiments, the method may further comprise receiving, from a user device, a report of an inbound error associated with at least one product, receiving an inbound error barcode mapped to the inbound error, and modifying the database to assign the inbound error barcode to at least one of the inbound barcode or the product identifier. The inbound error barcode may be mapped to the inbound error such that, when the inbound error barcode is scanned, the at least one processor may be configured to display, on the user device, a cause of the inbound error. In some embodiments, the cause of the inbound error may comprise at least one of a product image error, a barcode error, an expiration date error, a waybill error, a vendor error, a worker error, or a shipment error.

In some embodiments, scheduling inbound deliveries based on the predetermined priority rule may comprise scheduling inbound deliveries based on a type of delivery and a priority level associated with the type of delivery. In some embodiments, the type of delivery may include a first, second, and third types of delivery. A priority level associated with the first type of delivery may be greater than a priority level associated with the second type of delivery, and the priority level associated with the second type of delivery may be greater than a priority level associated with the third type of delivery.

Yet another aspect of the present disclosure is directed to a computer-implemented system for stowing products. The system may comprise a memory storing instructions and at least one processor configured to execute the instructions. The at least one processor may be configured to execute the instructions to schedule a delivery of an inbound pallet based on a predetermined priority rule, receive, from a user device, at least one of a waybill number, a reservation number, or a purchase order number associated with the inbound pallet containing at least one product, modify a database to assign an inbound barcode and at least one of the waybill number, the reservation number, or the purchase order number to the inbound pallet, receive, from the user device, at least one of the inbound barcode or a product identifier associated with the at least one product for stowing the at least one product, predict, after receiving at least one of the received inbound barcode or the product identifier, a zone for stowing the at least one product and a stowing capacity of the zone, receive, from the user device, a tote identifier associated with a tote containing the at least one product for stowing in the zone, modify the database to assign the product identifier associated with the at least one product and the tote identifier to the zone, receive, from the user device, a report of an inbound error associated with the at least one product, receive, from the user device, an inbound error barcode, and modify a database to assign the inbound error barcode to at least one of the inbound barcode or the product identifier. In some embodiments, the prediction may be based on a parameter associated with the product identifier. In some embodiments, the inbound error barcode may be mapped to the inbound error such that, when the inbound error barcode is scanned, the at least one processor is configured to display, on the user device, a cause of the inbound error.

Other systems, methods, and computer-readable media are also discussed herein.

BRIEF DESCRIPTION OF THE DRAWINGS

Figure 1C:
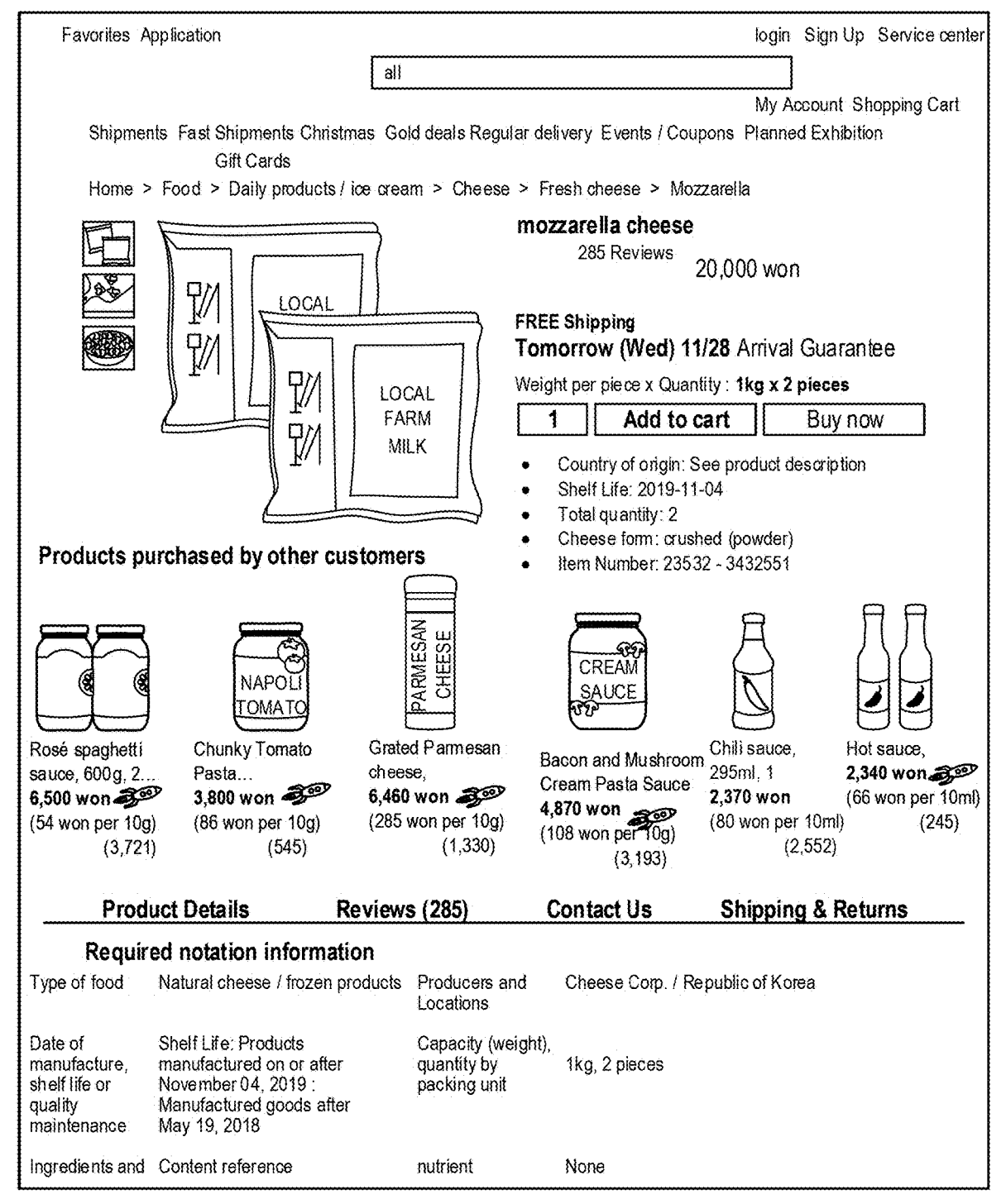

FIG. 1C depicts a sample Single Display Page (SDP) that includes a product and information about the product along with interactive user interface elements, consistent with the disclosed embodiments.

FIG. 4A is a diagrammatic illustration of an exemplary graphical user interface on a user device configured to facilitate receiving inbound products, consistent with the disclosed embodiments.

FIG. 4B is another diagrammatic illustration of the exemplary graphical user interface of FIG. 4A, consistent with the disclosed embodiments.

FIG. 5 is an exemplary database configured to store information associated with received inbound products, consistent with the disclosed embodiments

FIG. 7 is an exemplary database configured to store information associated with reported inbound errors, consistent with the disclosed embodiments.

DETAILED DESCRIPTION

Figure 1A:
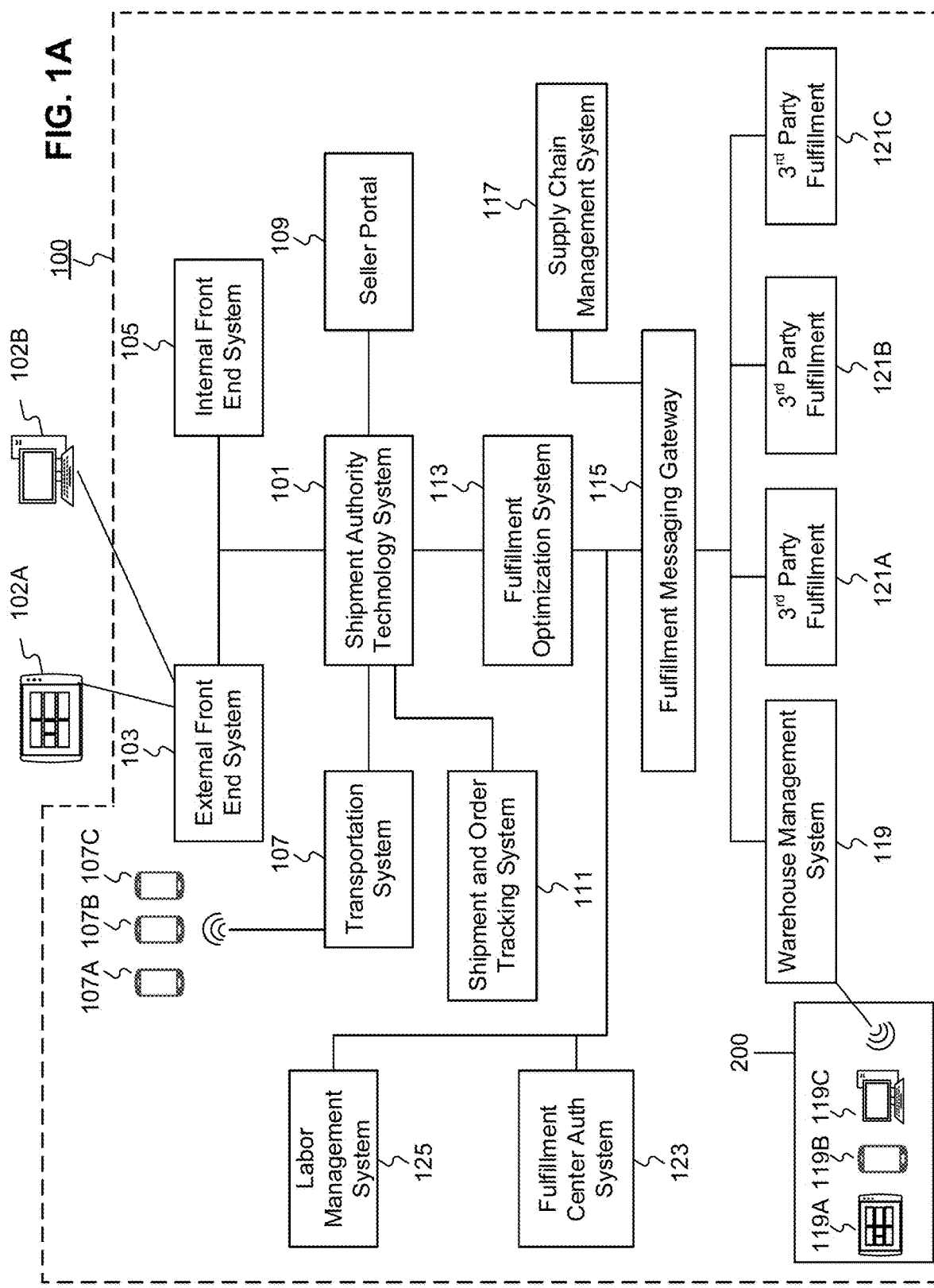
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for receiving inbound products and reporting inbound errors.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
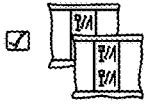
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task.

For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
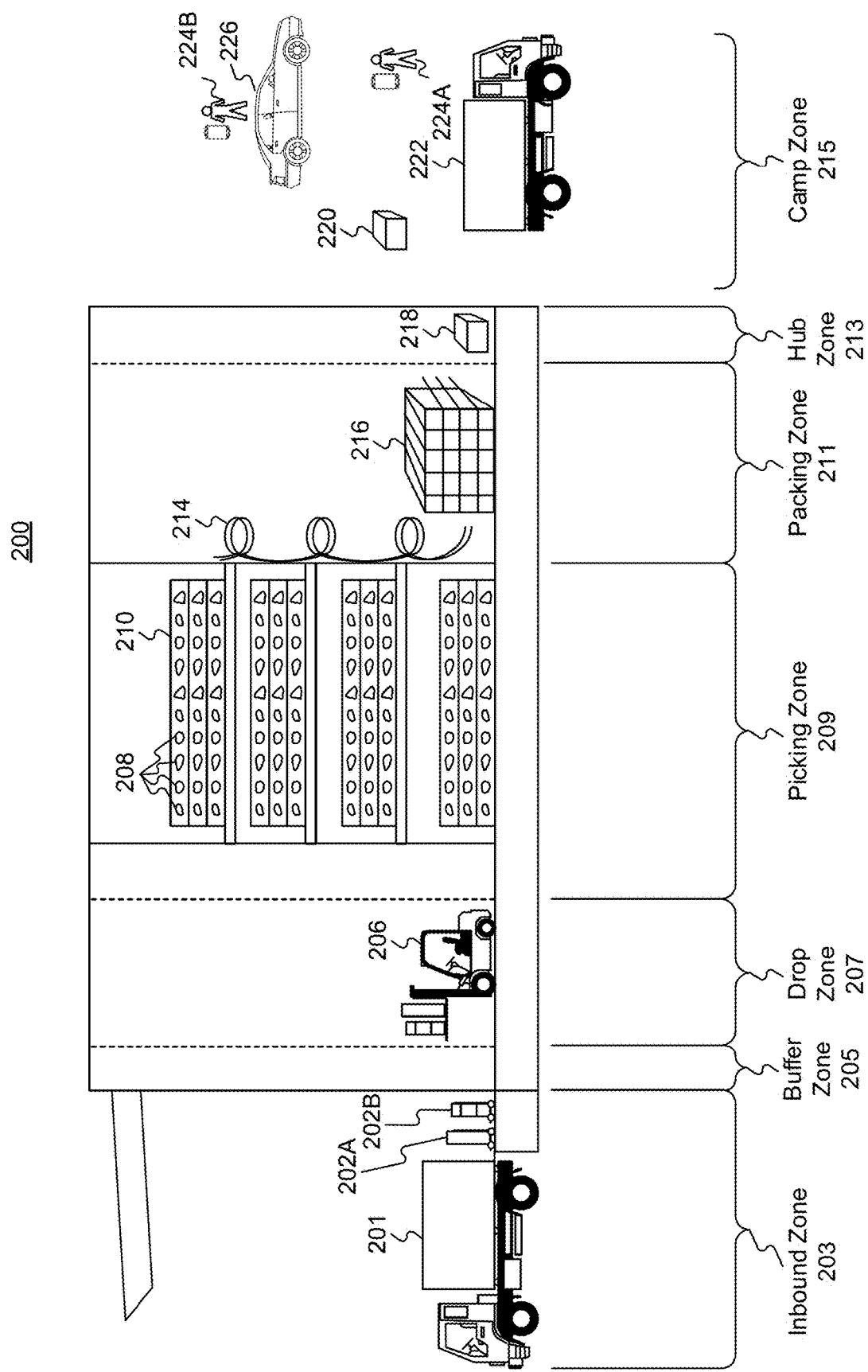
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
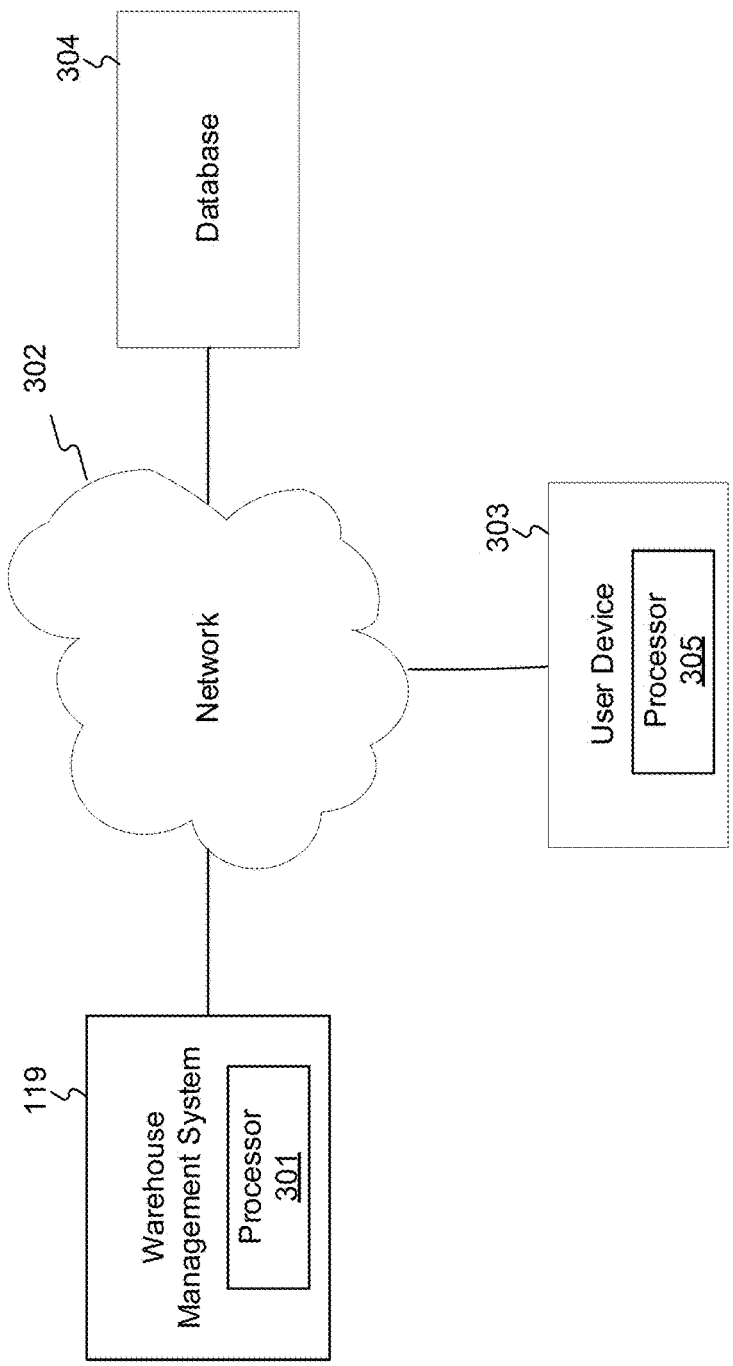
FIG. 3 is a schematic block diagram illustrating an exemplary embodiment of a system for receiving inbound products, consistent with the disclosed embodiments.

Referring to FIG. 3, a schematic block diagram 300 illustrating an exemplary embodiment of a system comprising warehouse management system 119 for receiving inbound products. Warehouse management system 119, in some embodiments, may be implemented as a computer system that receives inbound products and stores information associated with one or more inbound products. In addition, warehouse management system 119 may also store inbound errors that are reported and modify a database to monitor the reported inbound errors. In some embodiments, warehouse management system 119 may include one or more processors 301, which may schedule deliveries of inbound pallets based on a predetermined priority rule. In some embodiments, a pallet may comprise a shipping pallet comprising one or more products grouped together, such that the one or more products may be transferred simultaneously. However, not all embodiments may relate to inbound pallets. For example, in some embodiments, one or more processors 301 may schedule deliveries of inbound products based on a predetermined priority rule, and the inbound products may not need to be grouped into inbound pallets. One or more processors 301 may be configured to receive at least one of a waybill number, a reservation number, or a purchase order number associated with the inbound pallet containing at least one product. One or more processors 301 may be configured to modify a database, such as database 304, to assign an inbound barcode and at least one of the waybill number, the reservation number, or the purchase order number to the inbound pallet. By way of example, database 304 may store an inventory of every inbound product with its corresponding inbound barcode. Database 304 may further store other information associated with each inbound product, including but not limited to product identifier associated with each product, inbound quantity of each product, location identifier associated with each product, inbound error associated with each product, expected delivery date associated with each product, a timestamp of receiving each product, and details associated with each inbound error. Database 304 may include one or more memory devices that store information and are accessed through network 302. By way of example, database 304 may include Oracle™ databases, Sybase™ databases, or other relational databases or non-relational databases, such as Hadoop sequence files, HBase, or Cassandra. While database 304 is illustrated as being included in the system 300, it may alternatively be located remotely from system 300. In other embodiments, database 304 may be incorporated into warehouse management system 119 and/or user device 303. Database 304 may include computing components (e.g., database management system, database server, etc.) configured to receive and process requests for data stored in memory devices of database 304 and to provide data from database 304.

In some embodiments, one or more processors 301 may receive at least one of the inbound barcode or a product identifier associated with the at least one product when the product is ready for stowing. One or more processors 301 may predict a zone for stowing the at least one product and a stowing capacity of the zone. One or more processors 301 may display the predicted zone and the associated stowing capacity on user device 303, via network 302. In some embodiments, one or more processors 301 may receive, from one or more processors 305 of user device 303, a tote identifier associated with a tote containing the at least one product for stowing in the predicted zone, via network 302. After receiving the tote identifier, one or more processors 301 may modify a database, such as database 304, to assign the product identifier and the tote identifier to the predicted zone. As such, when either the tote identifier associated with a tote containing the at least one product or the product identifier associated with the at least one product is scanned, for example by a remote device (not shown) in warehouse management system 119, one or more processors 301 may send a location of the at least one product or the tote (e.g., the predicted zone), for display to user device 303.

System 300 may also comprise a network 302. Warehouse management system 119, user device 303, and database 304 may be connected and be able to communicate with each other via network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

System 300 may also comprise a server (not shown). The server may be a web server. The server, for example, may include hardware (e.g., one or more computers, including processors, storage, and input/output devices) and/or software (e.g., one or more applications) that deliver web content that can be accessed by, for example a user through a network (e.g., network 302), such as the Internet. The server may use, for example, a hypertext transfer protocol (HTTP, sHTTP, or HTTPS) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and the server may respond with the content of that resource or an error message if unable to do so. The server also may enable or facilitate receiving content from the user so the user may be able to, for example, submit web forms, including uploading of files. The server may also support server-side scripting using, for example, Active Server Pages (ASP), PHP, or other scripting languages. Accordingly, the behavior of the server can be scripted in separate files, while the actual server software remains unchanged.

In other embodiments, the server may be an application server, which may include hardware and/or software that is dedicated to the efficient execution of procedures (e.g., programs, routines, scripts) for supporting its applied applications. The server may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. The server may act as a set of components accessible through an API defined by the platform itself. For Web applications, these components may be performed in, for example, the same running environment as web servers, and application servers may support the construction of dynamic pages. Application servers also may implement services, such as, for example, clustering, fail-over, and load-balancing. In various embodiments, where application servers are Java application servers, the web servers may behave like an extended virtual machine for running applications, transparently handling connections to databases associated with a backend on one side, and, connections to the Web client on the other. In some embodiments, the server may be implemented within warehouse management system 119.

System 300 may further comprise a user device 303. While FIG. 3 illustrates user device 303 as being remote from warehouse management system 119, in some embodiments, user device 303 may be a user device within warehouse management system 119. User device 303 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. User device 303 may also be a tablet computer. Non-limiting examples of a tablet computer include an iPad, Kindle Fire, Playbook, Touchpad, and the like.

User device 303 may comprise one or more processors 305. In some embodiments, one or more processors 305 may be configured to communicate, via network 302, information with one or more processors 301 of warehouse management system 119. In some embodiments, for example, one or more processors 305 may be configured to send a waybill number, a reservation number, or a purchase order number associated with inbound pallets, via network 302, to one or more processors 301 of warehouse management system 119. One or more processors 305 may also be configured to send at least one of an inbound barcode or a product identifier associated with at least one product that is ready for stowing in FC 200 to one or more processors 301 in warehouse management system 119. One or more processors 305 may also be configured to transmit a tote identifier associated with a tote containing the at least one product for stowing to one or more processors 301 of warehouse management system 119 via network 302. Additionally or alternatively, one or more processors 305 may be configured to report inbound errors to one or more processors 301 of warehouse management system 119.

Figure 4C:
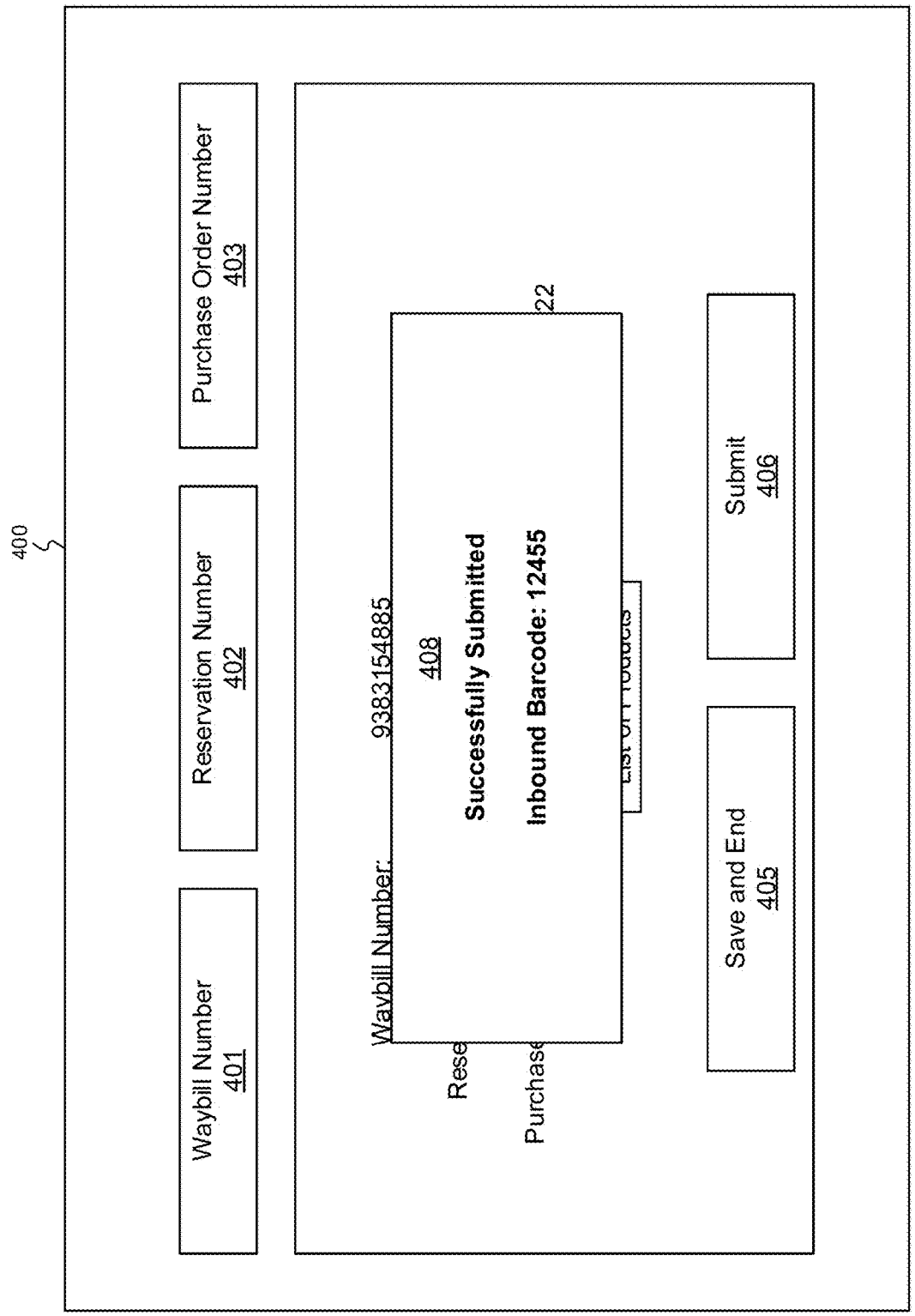
FIG. 4C is another diagrammatic illustration of the exemplary graphical user interface of FIG. 4A, consistent with the disclosed embodiments.

FIGS. 4A-4C depict exemplary embodiments of graphical user interface 400 that may be presented to the user on user device 303 and/or one or more remote devices (not shown) in warehouse management system 119. In particular, FIG. 4A shows an example embodiment of an interface 400 on user device 303 configured to display one or more inputs from the user. For example, interface 400 may be configured to receive at least one of a waybill number 401, a reservation number 402, or a purchase order number 403 associated with an inbound pallet. One or more processors 305 of user device 303 may be configured to receive and send a waybill number 401, a reservation number 402, or a purchase order number 403 to one or more processors 301 of warehouse management system 119, via network 302. For example, a user may press or click on a waybill number 401, a reservation number 402, or a purchase order number 403 and scan the corresponding number using user device 303, and one or more processors 305 may automatically display the scanned number in the waybill number 401, reservation number 402, and/or purchase order number 403 on the interface 400.

In some embodiments, when one or more processors 305 receives a waybill number 401 and/or a reservation number 402, one or more processors 305 may automatically populate the purchase order number 403. For example, when one or more processors 305 receives a waybill number 401 and/or a reservation number 402 and communicates the information to one or more processors 301 of warehouse management system 119, one or more processors 301 may look up the waybill number 401 and/or the reservation number 402 in database 304 and send a purchase order number 403 associated with the waybill number 401 and/or the reservation number 402 to one or more processors 305 of user device 303. As such, one or more processors 305 may automatically populate and display the purchase order number 403.

As seen in FIG. 4A, when one or more processors 305 receives at least one of the waybill number 401, the reservation number 402, or the purchase order number 403, one or more processors 305 may display the received waybill number 401, reservation number 402, or purchase order number 403 in corresponding portion 404 of interface 400. In some embodiments, portion 404 of interface 400 may display details associated with at least one of the waybill number 401, the reservation number 402, or the purchase order number 403. In some embodiments, a waybill number 401 and/or a reservation number 402 may be associated with a plurality of purchase order numbers 403. For example, when a manufacturer is shipping a plurality of purchase orders together in one shipment, a plurality of purchase order numbers associated with each corresponding purchase order may be associated with one waybill number or reservation number. As such, when one or more processors 305 receives a waybill number 401 and/or a reservation number 402, one or more processors 305 may automatically populate a plurality of purchase order numbers 403 (e.g., 1914220, 1914221, 1914222) in portion 404 of interface 400.

In some embodiments, each inbound pallet may be associated with a waybill number 401 and/or a reservation number 402, and each inbound pallet may comprise one or more purchase orders. Each purchase order may comprise one or more inbound products. As such, each inbound pallet may comprise one or more inbound products. However, not all embodiments may relate to inbound pallets. For example, in some embodiments, each product may be associated with a waybill number 401, a reservation number 402, and/or a purchase order number 403. In some embodiments, each purchase order may be associated with a priority level. The priority level may include a first priority level, a second priority level, and a third priority level. In some embodiments, there may be up to 20 priority levels. The first priority level may be indicative of a high priority level, the second priority level may be indicative of a medium priority level, and the third priority level may be indicative of a low priority level.

As seen in FIG. 4A, each purchase order number 403 may be assigned a color-coded circle next to the purchase order number 403. The color-coded circle may be indicative of a priority level associated with each purchase order number 403. For example, referring to FIG. 4A, purchase order number "1914220" is assigned a red color-coded circle. The red color-coded circle may be indicative of a first priority level or a high priority level. Purchase order number "1914221" is assigned a yellow color-coded circle. The yellow color-coded circle may be indicative of a second priority level or a medium priority level. Purchase order number "1914222" is assigned a white color-coded circle. The white color-coded circle may be indicative of a third priority level or a low priority level. While FIG. 4A illustrates color-coded circles as being indicative of a priority level associated with a purchase order number, one of ordinary skill in the art could envision using other methods of indicating the priority level, such as using different numbers, symbols, shapes, images, textures, patterns, or the like.

In some embodiments, the priority level associated with each purchase order number may be indicative of how quickly the purchase order needs to be stowed in FC 200. For example, when the purchase order number is associated with a first priority level or a high priority level, one or more processors 301 of warehouse management system 119 may provide a notification to one or more processors 305 of user device 303 to stow the one or more inbound products associated with the purchase order within a predetermined number of hours from receiving the one or more inbound products in FC 200. For example, one or more products associated with a purchase order number with a high priority level may need to be stowed within a range of 1 to 5 hours after receiving the one or more products in FC 200. When the purchase order number is associated with a second priority level or a medium priority level, one or more processors 301 of warehouse management system 119 may provide a notification to one or more processors 305 of user device 303 to stow the one or more inbound products associated with the purchase order within one day from receiving the one or more inbound products in FC 200. When purchase order number is associated with a third priority level or a low priority level, one or more processors 301 of warehouse management system 119 may provide a notification to one or more processors 305 of user device 303 to stow the one or more inbound products associated with the purchase order within a predetermined number of days from receiving the one or more inbound products in FC 200. For example, one or more products associated with a purchase order number with a low priority level may need to be stowed within a range of 1 to 5 days after receiving the one or more products in FC 200.

The priority level associated with each purchase order number may be based on the types of products in each purchase order. For example, a purchase order may comprise products that need to be kept frozen. Additionally or alternatively, a purchase order may comprise products with high customer demand relative to other products. Such purchase orders may be assigned a first priority level or a high priority level, so that the inbound products are stowed quickly and the products are delivered to the customers quickly.

As seen in FIG. 4A, once one or more processors 305 of user device 303 receives the waybill number 401, the reservation number 402, and/or the purchase order number 403, the user of user device 303 may click on the "Save and End" button if the user wants to save the entries, but wants to submit the inbound delivery to warehouse management system 119 at a later time. Additionally or alternatively, the user may click on the "Submit" button 406 to submit the inbound delivery for storing in warehouse management system 119. For example, when the user clicks on the "Submit" button 406, one or more processors 305 may send the waybill number 401, the reservation number 402, and/or the purchase order number 403 to one or more processors 301 of warehouse management system 119.

In some embodiments, once the one or more processors 301 of warehouse management system 119 receives the waybill number 401, the reservation number 402, and/or the purchase order number 403, one or more processors 301 of warehouse management system 301 may assign an inbound barcode to at least one of the waybill number 401, the reservation number 402, or the purchase order number 403 associated with the inbound pallet. The inbound barcode may comprise an identifier used to identify each inbound pallet within FC 200 once the inbound pallet has been delivered to FC 200. For example, warehouse management system 119 may store an inventory of every inbound pallet received in FC 200 as well as details associated with each inbound pallet in database 304. As such, when a user looks up the inbound barcode in database 304, one or more processors 301 may display the waybill number 401, the reservation number 402, and/or the purchase order number 403 associated with the inbound barcode. After assigning an inbound barcode to the inbound pallet, one or more processors 301 may send the inbound barcode to one or more processors 305 for display on interface 400 of user device 303. For example, referring now to FIG. 4C, once the user clicks on the "Submit" button 406, one or more processors 305 may display a notification 408 on interface 400. Notification 408 may indicate that the submission of the inbound pallet delivery was successful and may also display the inbound barcode assigned to the inbound pallet.

In some embodiments, once the one or more processors 301 of warehouse management system 119 receives the waybill number 401, the reservation number 402, and/or the purchase order number 403, one or more processors 301 may modify database 304 to assign the inbound barcode and at least one of the waybill number 401, the reservation number 402, or the purchase order number 403 to the inbound pallet containing the at least one inbound product.

Referring back to FIG. 4A, a user of user device 303 may also be able to view a list of inbound products associated with each inbound pallet by clicking on the "List of Products" button 407. As discussed above, each inbound pallet is associated with a waybill number 401, a reservation number 402, and/or a purchase order number 403. Each inbound pallet may comprise one or more purchase orders, each purchase order comprising one or more inbound products. As such, each waybill number 401 and/or reservation number 402 may be associated with one or more purchase order numbers 403. When the user of user device 303 clicks on the "List of Products" button 407, one or more processors 305 may be configured to display, on interface 400 of user device 303, a list of each inbound product associated with each purchase order number 403 in the inbound pallet.

FIG. 4B illustrates an exemplary interface 400 displaying a list of each inbound product associated with each purchase order number 403 in the inbound pallet of FIG. 4A. Interface 400 may display each purchase order number 403 associated with the inbound pallet, the name of each product in each purchase order number 403, a priority level associated with each product, and/or a product identifier associated with each product.

The priority level associated with each product may be similar to the priority level associated with each purchase order number. For example, the priority level associated with each purchase order number may include a first priority level, a second priority level, and a third priority level. In some embodiments, there may be up to 20 priority levels. The first priority level may be indicative of a high priority level, the second priority level may be indicative of a medium priority level, and the third priority level may be indicative of a low priority level. In some embodiments, the priority level associated with each product may be indicative of how quickly the product needs to be stowed in FC 200. The priority level associated with each product may be based on the type of each product. For example, a product that needs to be kept frozen may be assigned a first priority level or a high priority level. Additionally or alternatively, a product with high customer demand relative to other products may be assigned a first priority level or a high priority level, so that the product is stowed quickly and delivered to the customers quickly.

In some embodiments, the priority level associated with each purchase order number 403 may be based on an algorithm that takes into account the priority level associated with each product in the purchase order. For example, one or more processors 301 of warehouse management system 119 may aggregate the priority level associated with each product in a purchase order, weight the priority level associated with each product in the purchase order, and assign a priority level to the purchase order. For example, if there are two products with high priority level, one product with medium priority level, and one product with low priority level in a purchase order, one or more processors 301 may assign a high priority level to the purchase order. On the other hand, if there is one product with medium priority level and two products with low priority level, one or more processors 301 may assign a medium priority level to the purchase order.

FIG. 5 illustrates an exemplary database 304 configured to store information associated with the inbound pallets in an exemplary table. As discussed above, one or more processors 301 of warehouse management system 119 may be configured to modify database 304 to store information associated with inbound products. By way of example, when one or more processors 301 receives information associated with an inbound pallet from one or more processors 305 of user device 303, one or more processors 301 may modify database 304 to store at least one of a waybill number 401, a reservation number 402, and/or purchase order number 403. For example, referring back to FIG. 4A, when the user inputs the waybill number 401, the reservation number 402, and/or the purchase order number 403, one or more processors 305 may send these information to one or more processors 301. When one or more processors 301 receives the information, one or more processors 301 may modify database 304 to store the waybill number 401, the reservation number 402, and/or the purchase order number 403 received from one or more processors 305 of user device 303.

In some embodiments, one or more processors 301 may also assign an inbound barcode 501 to the inbound pallet and modify database 304 to store the inbound barcode 501 associated with the inbound pallet. Referring to FIG. 4C, for example, when the user clicks the "Submit" button 406, one or more processors 301 may assign an inbound barcode to the inbound pallet and modify database 304 to assign the inbound barcode 501 and at least one of the waybill number 401, the reservation number 402, or the purchase order number 403 to the inbound pallet.

In some embodiments, one or more processors 301 may also be configured to store a manufacturer name 502 associated with each inbound pallet. By way of example, one or more processors 301 may modify database 304 to store the manufacturer 502, from which the inbound pallet was received. In other embodiments, one or more processors 301 may be configured to store an expected delivery date 503 and a timestamp 504 associated with each inbound pallet in database 304. The expected delivery date 503 may comprise the date and/or time, at which the inbound pallet was originally scheduled to be delivered to FC 200 from the manufacturer. The timestamp 504 may comprise the physical date and/or time, at which the inbound pallet was delivered to FC 200 from the manufacturer. As will be discussed in more detail below, if there is a discrepancy between the expected delivery date 503 and the timestamp 504 associated with an inbound pallet, one or more processors 305 of user device 303 may provide a report of an inbound error to one or more processors 301 of warehouse management system 119. In some embodiments, one or more processors 301 may be configured to store the number of pallets 505 associated with each delivery of an inbound pallet and the number of boxes 506 in each pallet. As such, one or more processors 301 may be able to determine whether the correct number of pallets 505 and/or number boxes 506 have been delivered from the manufacturer to FC 200.

Figure 6A:
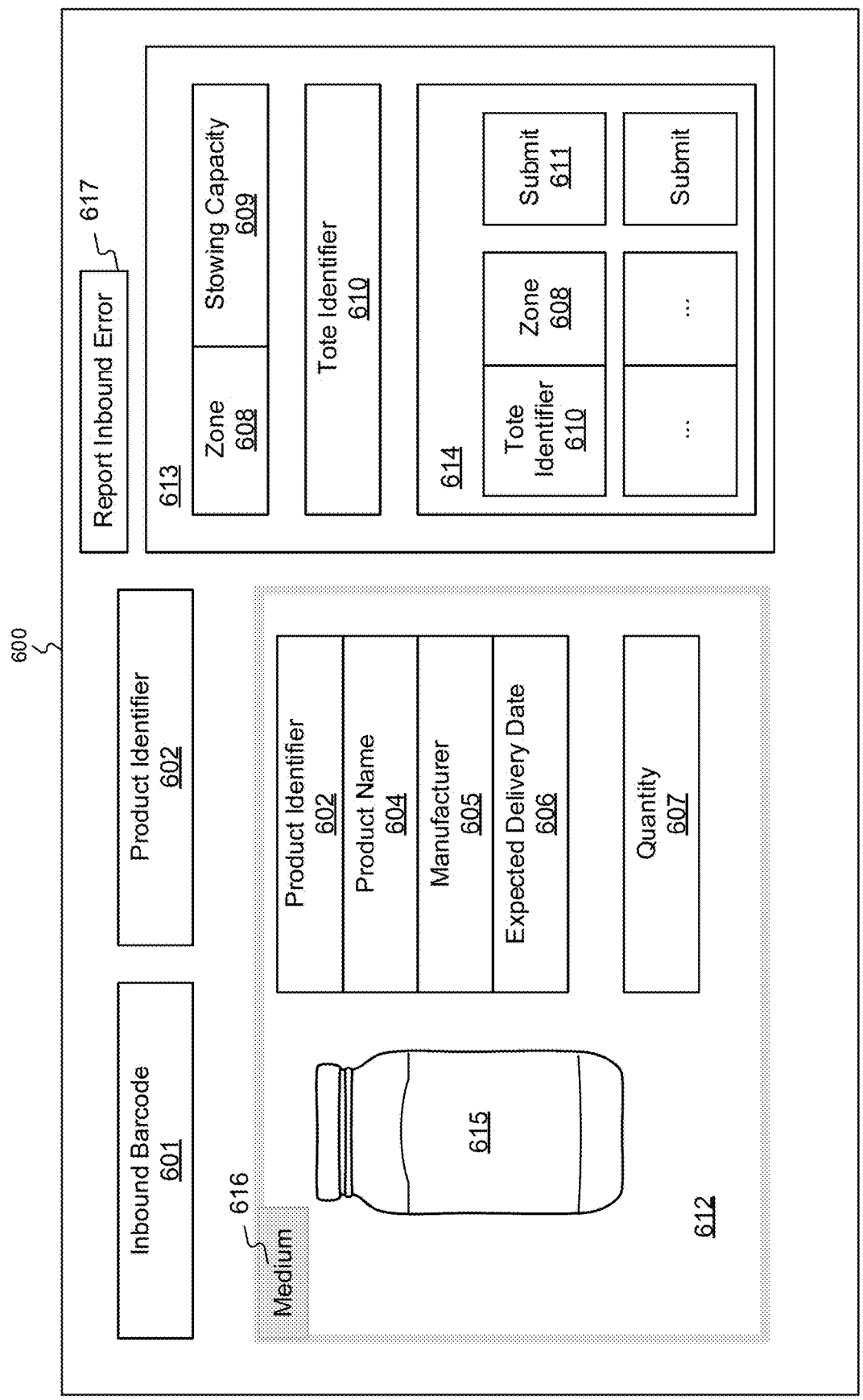
FIG. 6A is a diagrammatic illustration of an exemplary graphical user interface on a user device configured to facilitate stowing an inbound product, consistent with the disclosed embodiments.
Figure 6B:
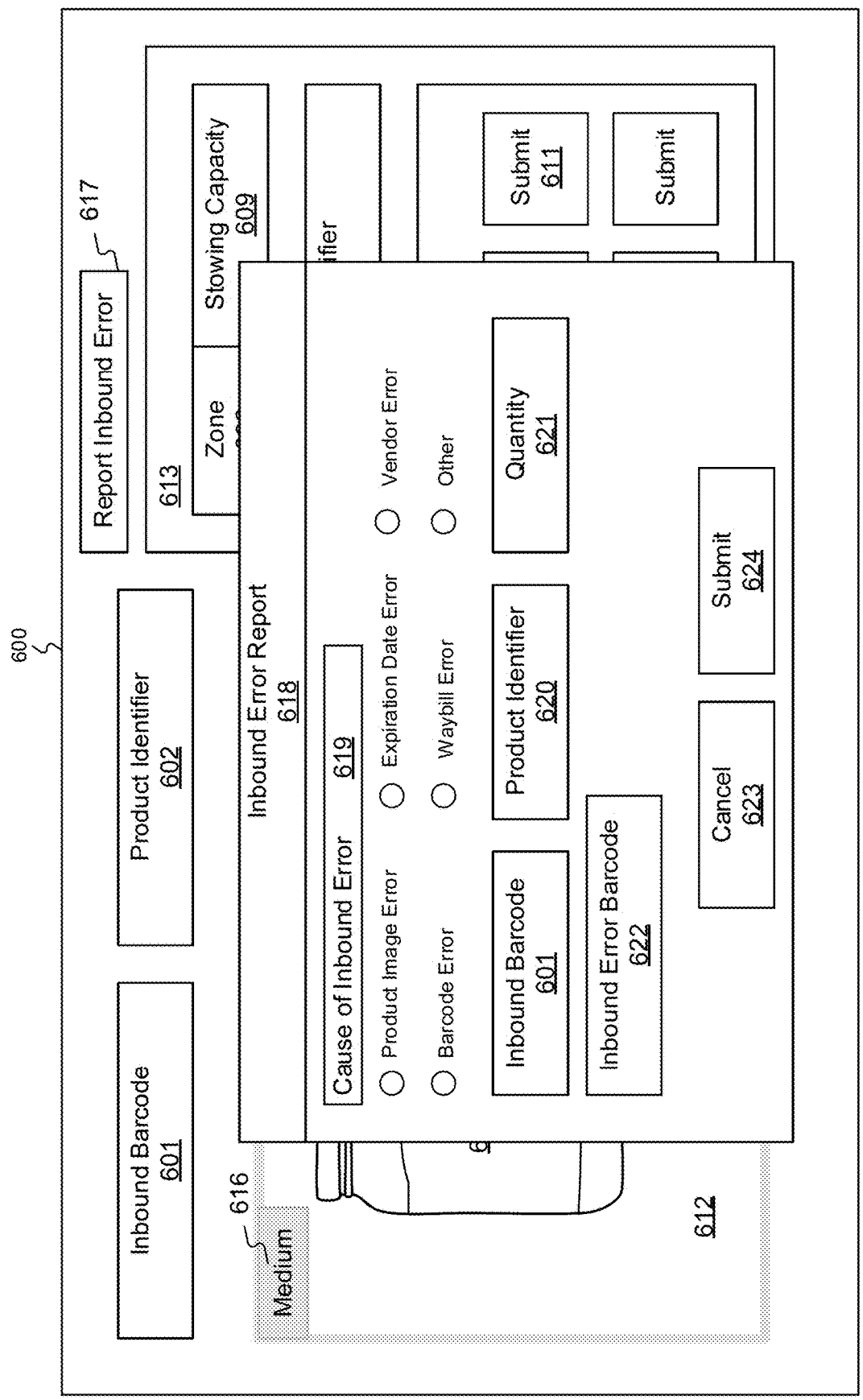
FIG. 6B is a diagrammatic illustration of an exemplary graphical user interface on a user device configured to facilitate reporting an inbound error, consistent with the disclosed embodiments.

FIGS. 6A-6B depict exemplary embodiments of graphical user interface 600 that may be presented to the user on user device 303 and/or one or more remote devices (not shown) in warehouse management system 119. In particular, FIG. 6A shows an exemplary embodiment of interface 600 on user device 303 configured to facilitate stowing an inbound product. In some embodiments, one or more processors 305 of user device 303 may receive, from a user, an inbound barcode 601 and/or a product identifier 602 associated with an inbound product for stowing. The inbound barcode 601 may be the inbound barcode assigned to an inbound pallet containing the inbound product by one or more processors 301 of warehouse management system 119. Once one or more processors 305 receives an inbound barcode 601 and/or a product identifier 602 associated with the inbound product for stowing, one or more processors 305 may automatically populate an image 615 of the inbound product, the product identifier 602, the product name 604, the manufacturer 605, and the expected delivery date 606 associated with the inbound product on a portion 612 of interface 600. For example, once one or more processors 305 receives an inbound barcode 601 and/or a product identifier 602 associated with the inbound product for stowing, one or more processors 305 may transmit the inbound barcode 601 and/or the product identifier 602 to one or more processors 301 of warehouse management system 119. Once one or more processors 301 receives the inbound barcode 601 and/or the product identifier 602, one or more processors 301 may look up the inbound barcode 601 and/or the product identifier 602 in database 304 and transmit details associated with the inbound product back to one or more processors 305 of user device 303 for display on interface 600. For example, one or more processors 301 may send the image 615 of the inbound product, the product identifier 602, the product name 604, the manufacturer 605, and/or the expected delivery date 606 associated with the inbound product to one or more processors 305 for display on portion 612 of interface 600. In some embodiments, one or more processors 305 may populate additional details associated with the inbound product including, but not limited to, a manufacturing date of the inbound product and an expiry date or expiration date of the inbound product. While FIG. 6A illustrates the image 615 of the inbound product, the product identifier 602, the product name 604, the manufacturer 605, and the expected delivery date 606 associated with the inbound product displayed on portion 612 of interface 600, one of ordinary skill in the art would envision other details associated with the inbound product to be displayed on interface 600, such as a reservation number, a waybill number, a color, a size, or the like associated with the inbound product.

In some embodiments, one or more processors 305 may also automatically populate a priority level 616 associated with the inbound product. By way of example, once one or more processors 301 receives the inbound barcode 601 and/or the product identifier 602 associated with the inbound product, one or more processors 301 may look up the inbound barcode 601 and/or the product identifier 602 in database 304 and transmit a priority level 616 associated with the inbound product back to one or more processors 305 of user device 303 for display on interface 600. As shown in FIG. 4A, the priority level 616 associated with the inbound product may be color-coded. If the priority level 616 is high, one or more processors 305 may display a red outline around portion 612 of interface 600. If the priority level is medium, one or more processors 305 may display a yellow outline around portion 612 of interface 600. If the priority level is low, one or more processors 305 may not display a colored outline around portion 612 of interface 600. As seen in FIG. 6A, because a priority level associated with the inbound product is medium, one or more processors 305 may display a yellow outline around portion 612 of interface 600. While FIG. 6A illustrates the colored outline as being indicative of a priority level associated with the inbound product, one of ordinary skill in the art could envision using other methods of indicating the priority level, such as using different numbers, symbols, shapes, images, textures, patterns, or the like.

As discussed above, the priority level 616 associated with each product may be indicative of how quickly the product needs to be stowed in FC 200. For example, when a product is associated with a first priority level or a high priority level, one or more processors 301 of warehouse management system 119 may provide a notification to one or more processors 305 of user device 303 to stow the product within a predetermined number of hours (e.g., 1 to 5 hours) from receiving the product in FC 200. When the product is associated with a second priority level or a medium priority level, one or more processors 301 of warehouse management system 119 may provide a notification to one or more processors 305 of user device 303 to stow the product within one day from receiving the product in FC 200. When the product is associated with a third priority level or a low priority level, one or more processors 301 of warehouse management system 119 may provide a notification to one or more processors 305 of user device 303 to stow the product within a predetermined number of days (e.g., 1 to 5 days) from receiving the product in FC 200.

The priority level 616 associated with each product may be based on the type of each product. For example, a product that needs to be kept frozen may be assigned a first priority level or a high priority level. Additionally or alternatively, a product with high customer demand relative to other products may be assigned a first priority level or a high priority level, so that the product is stowed quickly and delivered to the customers quickly. Referring to FIG. 6A, the inbound product may need to be refrigerated and, as such, one or more processors 301 may assign a medium priority level to the inbound product. Accordingly, one or more processors 301 may provide a notification (e.g., instructions to display a "Medium" priority level 616 and a yellow outline around portion 612 of interface 600) that indicates that the inbound product must be stowed within one day of receiving the inbound product at FC 200.

In some embodiments, the user of user device 303 may input a quantity 607 of the inbound product for stowing. Once the user inputs the quantity 607 on interface 600, one or more processors 305 may send the quantity 607 of inbound product for stowing to one or more processors 301. One or more processors 301 may predict a zone 608 within FC 200 for stowing the inbound product. By way of example, one or more processors 301 may predict the zone 608 for stowing the inbound product based on one or more parameters associated with the product identifier 602 associated with the inbound product. Accordingly, one or more processors 301 may predict the zone 608 for stowing the inbound product based on an algorithm that aggregates and weighs one or more parameters associated with the product identifier 602. One or more parameters associated with the product identifier 602 may comprise at least one of a priority level of the product identifier, a dimension of the product associated with the product identifier, a volume of the product associated with the product identifier, a weight of the product associated with the product identifier, a temperature in which the product associated with the product identifier needs to be stored, a product grade associated with the product identifier, or an expiration date of the product associated with the product identifier. One or more of these parameters may be used to predict the zone 608 for stowing the inbound product. By way of example, all product identifiers with a first product grade and a volume greater than 100,000 cm³ may be directed to a particular zone 608 for stowing.

While it may not be required for the user of user device 303 to stow the inbound product in the predicted zone 608, by providing and displaying the predicted zone 608 for stowing the inbound product, time spent to find an empty zone within FC 200 for stowing the inbound product can be reduced. In addition, while conventional systems and methods for stowing products designate fixed locations within a fulfillment center for stowing each product, one or more processors 301 may reduce stowing time, shipment time, and, ultimately, delivery time by providing a predicted zone 608. For example, the predicted zone 608 may be an optimal zone 608 that is closest to the user of user device 303, capable of accommodating the dimension, weight, and/or quantity of the inbound product, capable of maintaining the inbound product at a desired temperature, and/or likely to be shipped out to the customer within a time period before the expiration date of the inbound product. Additionally or alternatively, if the zones within FC 200 are organized by priority levels, one or more processors 301 may also provide a predicted zone 608 that corresponds to the priority level 616 associated with the inbound product.

Once one or more processors 301 has predicted a zone 608 within FC 200 for stowing the inbound product, one or more processors 301 may send the predicted zone 608 along with a stowing capacity 609 associated with the predicted zone 608 to one or more processors 305 for display on portion 613 of interface 600. For example, the stowing capacity 609 may comprise a number of empty slots within the predicted zone 608 that are capable of receiving an inbound product or an inbound pallet. The user of user device 303 may need to confirm that the quantity 607 of the inbound product for stowing is less than or equal to the stowing capacity 609 of the predicted zone 608.

In some embodiments, the user may begin stowing the inbound product at the predicted zone 608 by selecting a tote for placing the inbound product. The tote may be associated with a tote identifier 610. The user may input the tote identifier 610 associated with the tote containing the inbound product for stowing in interface 600. Once the user inputs the tote identifier 610, one or more processors 305 may modify interface 600 to automatically populate the tote identifier 610 and the predicted zone 608, at which the tote associated with the tote identifier 610 will be stowed, in portion 614 of interface 600. One or more processors 305 may display a list of all tote identifiers 610 and corresponding zones 608 in portion 614 of interface 600. Once the user is ready to stow the inbound products in their respective totes, the user may click the "Submit" button 611.

Once the user clicks the "Submit" button 611, one or more processors 305 may send the tote identifier 610 and the corresponding zone 608 to one or more processors 301 of warehouse management system 119. One or more processors 301 may modify database 304 to assign the product identifier 602 associated with the inbound product contained in the tote and the tote identifier 610 to the predicted zone 608. As such, one or more processors 301 may maintain an inventory, in database 304, of each tote and product that is stowed in each zone within FC 200.

In some embodiments, inbound errors may arise while the user is stowing the inbound products. As such, user device 303 may provide interface 600 that facilitates reporting inbound errors. By way of example, the user may click on the "Report Inbound Error" button 617 in interface 600 to begin reporting inbound errors.

FIG. 6B illustrates another exemplary embodiment of interface 400 on user device 303 configured to facilitate reporting an inbound error associated with an inbound product. When the user of user device 303 clicks on the "Report Inbound Error" button 617 in interface 600, one or more processors 305 may display an inbound error report interface 618 that facilitates reporting of inbound errors. One or more processors 305 may request the user to select a cause of the inbound error 619 in the inbound error report interface 618. The cause of the inbound error 619 may include, but is not limited to, a product image error, a barcode error, an expiration date error, a waybill error, a vendor error, a worker error, or a shipment error. A product image error may comprise an error with an image 615 of the product displayed in portion 612 of interface 600 (see FIG. 6A). The barcode error may comprise a damage to the inbound barcode 601, the product identifier 602, and/or the tote identifier 610 such that the codes/identifiers are not readable or scannable. An expiration date error may comprise an error with the expiration date of the inbound product. For example, if the expiration date of the inbound product is past and the inbound product can no longer be shipped out to the customers, the user may select expiration date error as the cause of the inbound error 619. A waybill error may comprise an error with the waybill associated with the inbound product. For example, if the waybill number, such as waybill number 401, is damaged such that the waybill number 401 is not scannable or readable, then the user may select waybill error as the cause of the inbound error 619. A vendor error may comprise, for example, a damaged product that has been sent from the manufacturer and/or the vendor to FC 200. For example, when the user has received a damaged inbound product, the user may select vendor error as the cause of the inbound error 619. A worker error may comprise an error made by the user of user device 303. For example, if the user has damaged an inbound product while stowing, the cause of the inbound error 619 may comprise a worker error. In some embodiments, when a wrong quantity of an inbound product has arrived from the vendor and/or the manufacturer, then the cause of the inbound error 619 may comprise a shipment error. In other embodiments, if the timestamp associated with the inbound product is later than the expected delivery date of the inbound product, then the cause of the inbound error 619 may comprise a shipment error. While FIG. 6B illustrates a product image error, a barcode error, an expiration date error, a waybill error, or a vendor error, other possible errors may comprise a system error, an error due to natural disaster, a tracking error, product damage, or any possible error that may occur during the process of receiving inbound deliveries.

After selecting the cause of the inbound error 619, the user may input the inbound barcode 601 associated with the product with the inbound error, the product identifier 620 associated with the product with the inbound error, and/or the quantity 621 of the product with the inbound error. In some embodiments, the user may also input an inbound error barcode 622 to be associated with the product with the inbound error. Once the user inputs the inbound error barcode 622, the inbound error barcode 622 may be mapped, in database 304, to the inbound error associated with the product. That is, the inbound error barcode 622 may be mapped to the cause of the inbound error 619 selected by the user, the inbound barcode 601 associated with the product with the inbound error, the product identifier 620 associated with the product with the inbound error, and/or the quantity 621 of the product with the inbound error in database 304.

As such, when the inbound error barcode 622 is scanned, by user device 303 or one or more remote devices within warehouse management system 119, one or more processors 305 may be configured to display, on the corresponding device, the cause of the inbound error 619 selected by the user, the inbound barcode 601 associated with the product with the inbound error, the product identifier 620 associated with the product with the inbound error, and/or the quantity 621 of the product with the inbound error.

If the user wants to cancel submitting an inbound error report, the user may click the "Cancel" button 623. If the user clicks the "Cancel" button 623, one or more processors 305 of user device 303 may close the inbound error report interface 618 and return to interface 600 of FIG. 6A. If the user wants to submit the inbound error report, the user may click the "Submit" button 624. Once the user clicks the "Submit" button 624, one or more processors 305 may report the inbound error to one or more processors 301 of warehouse management system 119. As such, one or more processors 301 may be configured to receive the inbound error barcode 622 mapped to the inbound error report. Once one or more processors 301 receives the inbound error report and the corresponding inbound error barcode 622 from user device 303, one or more processors 301 may modify database 304 to assign the inbound error barcode 622 to at least one of the inbound barcode 601 or the product identifier 602 associated with the inbound product with the inbound error.

FIG. 7 shows information associated with reported inbound errors that may be stored in a table of exemplary database 304. As discussed above, one or more processors 301 of warehouse management system 119 may be configured to modify database 304 to store information associated with reported inbound errors. By way of example, one or more processors 301 may be configured to modify database 304 to store the inbound error barcode, such as inbound error barcode 622. One or more processors 301 may be also be configured to assign information associated with each inbound error to its corresponding inbound error barcode. For example, one or more processors 301 may be configured to modify database 304 to store an inbound barcode 601, a product identifier 620 associated with the inbound product with the inbound error, and a quantity 621 of the inbound product with the inbound error to its corresponding inbound error barcode 622. Additionally or alternatively, one or more processors 301 may be configured to modify database 304 to assign at least one of a waybill number, such as waybill number 401, a reservation number, such as reservation number 402, a purchase order number, such as purchase order number 403, and/or a priority level associated with the inbound product with the inbound error to the inbound error barcode 622.

Because the inbound barcode, the waybill number, the product identifier, the reservation number, and/or the purchase order number may be assigned and/or mapped to the inbound error barcode in database 304, one or more processors 301 and one or more processors 305 may be able to identify inbound errors more quickly so that the inbound errors can be resolved more quickly. In some embodiments, one or more processors 301 may also modify database 304 to provide a real-time status update 701 of each inbound error. For example, one or more processors 301 may be configured to modify database 304 to assign a "Reported" status or a "Resolved" status to each inbound error barcode 622. A "Reported" status may indicate that the inbound error has been reported and that the inbound error is in the process of being resolved. A "Resolved" status may indicate that the inbound error has been reported and has been resolved.

Conventionally, when inbound deliveries arrive at fulfillment centers, the deliveries may remain unattended for hours and/or days. As such, the stowing of delivered inbound products at fulfillment centers may be delayed, and ultimately, the shipment and delivery of products to customers may be delayed. In addition, even though inbound errors are inevitable, if deliveries of inbound products remain unattended for hours and/or days, the inbound errors not only be reported late but also resolved late. On the other hand, by providing an interface on a user device, such as interface 600, for automatically reporting inbound errors as the inbound products are stowed and by maintaining a database, such as database 304, that may store information associated with each inbound error report, one or more processors 301 may be able to expedite the rate at which each inbound error is reported and resolved, thereby accelerating the shipment time and delivery time of products to customers.

Figure 8:
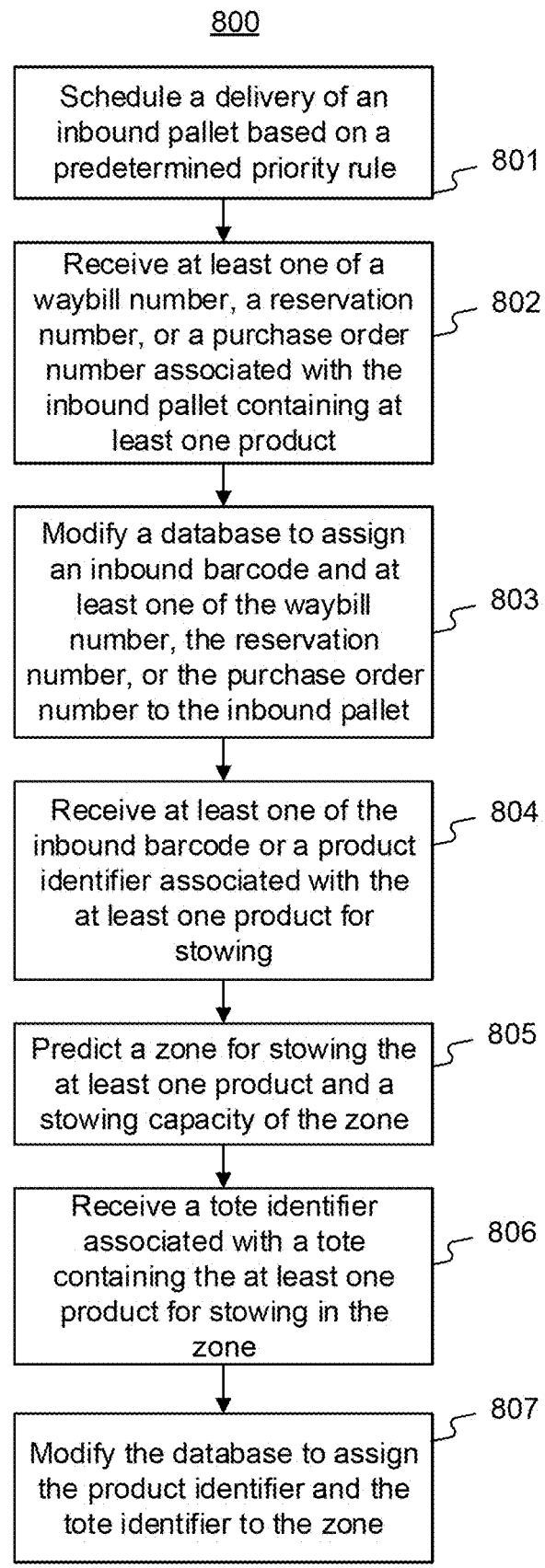
FIG. 8 is a flowchart illustrating an exemplary embodiment of a method for receiving inbound products, consistent with the disclosed embodiments.

FIG. 8 is a flow chart illustrating an exemplary method 800 for receiving inbound products. This exemplary method is provided by way of example. Method 800 shown in FIG. 8 can be executed or otherwise performed by one or more combinations of various systems. Method 800 as described below may be carried out by one or more processors 301 of warehouse management system 119, as shown in FIG. 3, by way of example. While various elements of warehouse management system 119 are referenced in explaining the method of FIG. 8, it should be noted that various elements of user device 303 may carry out the method of FIG. 8. Each block shown in FIG. 8 represents one or more processes, methods, or subroutines in the exemplary method 800. Referring to FIG. 8, exemplary method 800 may begin at block 801.

At block 801, one or more processors 301 may schedule a delivery of an inbound pallet based on a predetermined priority rule. By way of example, one or more processors 301 may be configured to schedule deliveries of inbound pallets based on a type of delivery and/or a priority level associated with the type of delivery. The type of delivery may comprise, for example, a delivery of inbound pallet by truck, a delivery of inbound pallet by packages, or a delivery of inbound pallet by sending a worker from FC 200 to pick up the inbound pallet from a vendor or a manufacturer. Each type of delivery may be associated with a different priority level. For example, a truck delivery of an inbound pallet may have a priority level that is greater than a priority level associated with a package delivery. In addition, the priority level associated with a package delivery may be greater than a priority level of a delivery of an inbound pallet by sending a worker from FC 200 to pick up the inbound pallet from a vendor or a manufacturer. The priority level associated with each type of delivery may be predetermined by warehouse management system 119. Based on the type of delivery and the priority level associated with the type of delivery, one or more processors 301 may schedule deliveries of inbound pallets. By way of example, one or more processors 301 may schedule all truck deliveries of inbound pallets in the morning, schedule all package deliveries of inbound pallets in the afternoon, and schedule all deliveries requiring sending workers to pick up inbound pallets from vendors and/or manufacturers in the evening.

Once the deliveries of inbound pallets are scheduled based on a predetermined priority rule, method 800 may proceed to block 802. At block 802, one or more processors 301 may receive at least one of a waybill number, a reservation number, or a purchase order number associated with an inbound pallet containing at least one product that has been delivered to FC 200. For example, as discussed with reference to FIG. 4A, one or more processors 301 may at least one of a waybill number 401, a reservation number 402, or a purchase order number 403 associated with an inbound pallet from one or more processors 305 of user device 303. As such, when a user of user device 303 scans at least one of a waybill number 401, a reservation number 402, or a purchase order number 403 associated with an inbound pallet, one or more processors 305 may send at least one of the waybill number 401, the reservation number 402, or the purchase order number 403 to one or more processors 301 of warehouse management system 119.

At block 803, when one or more processors 301 receives at least one of the waybill number 401, the reservation number 402, or the purchase order number 403, one or more processors 301 may assign an inbound barcode to at least one of the waybill number 401, the reservation number 402, or the purchase order number 403 associated with the inbound pallet. As discussed above, the inbound barcode may comprise an identifier used to identify each inbound pallet within FC 200 once the inbound pallet has been delivered to FC 200. For example, warehouse management system 119 may store an inventory of every inbound pallet received in FC 200 as well as details associated with each inbound pallet in database 304. As such, when a user looks up the inbound barcode in database 304, one or more processors 301 may display the waybill number 401, the reservation number 402, and/or the purchase order number 403 associated with the inbound barcode. At block 803, one or more processors 301 may also modify a database, such as database 304, to assign the inbound barcode and at least one of the waybill number 401, the reservation number 402, or the purchase order number 403 to the inbound pallet containing the at least one inbound product.

Method 800 may proceed to block 804, at which one or more processors may receive at least one of an inbound barcode or a product identifier associated with the at least one product for stowing. For example, the inbound product that has been delivered to FC 200 and has been input to database 304 may be ready for stowing in FC 200. As such, one or more processors 301 may receive, from user device 305, at least one of the inbound barcode or the product identifier associated with the inbound product for stowing.

After receiving at least one of the inbound barcode or the product identifier associated with the inbound product for stowing, method 800 may proceed to block 805. At block 805, one or more processors 301 may be configured to predict a zone within FC 200 for stowing the inbound product. One or more processors 301 may also be configured to predict a stowing capacity at the predicted zone. By way of example, one or more processors 301 may predict a zone, such as zone 608, for stowing the inbound product based on one or more parameters associated with the product identifier associated with the inbound product. For instance, one or more processors 301 may predict the zone for stowing the inbound product based on an algorithm that aggregates and weighs one or more parameters associated with the product identifier associated with the inbound product. One or more parameters associated with the product identifier may include, but is not limited to, a priority level of the product identifier, a dimension of the product associated with the product identifier, a weight of the product associated with the product identifier, or an expiration date of the product associated with the product identifier.

While it may not be required for the user to stow the inbound product in the zone predicted by one or more processors 301, by providing the predicted zone for stowing the inbound product, time spent finding an empty zone within FC 200 for stowing the inbound product can be reduced. In addition, while conventional systems and methods for stowing products designate fixed locations within a fulfillment center for stowing each product, one or more processors 301 may reduce stowing time, shipment time, and, ultimately, delivery time by providing a predicted zone. For example, the predicted zone may be an optimal zone that is closest to the user of user device 303, capable of accommodating the dimension, weight, and/or quantity of the inbound product, capable of maintaining the inbound product at a desired temperature, and/or likely to be shipped out to the customer within a time period before the expiration date of the inbound product. Additionally or alternatively, if the zones within FC 200 are organized by priority levels, one or more processors 301 may also provide a predicted zone that corresponds to the priority level associated with the inbound product. At block 805, one or more processors 301 may also be configured to provide the stowing capacity associated with the predicted zone. The user stowing the inbound product may need to confirm that the quantity of the inbound product for stowing is less than or equal to the stowing capacity of the predicted zone.

After predicting the zone for stowing the at least one product and providing a stowing capacity of the predicted zone, method 800 may proceed to block 806. At block 806, one or more processors 301 may receive a tote identifier associated with a tote containing the inbound product for stowing in the predicted zone. By way of example, a user may begin stowing the inbound product at the predicted zone by selecting a tote for placing the inbound product. The tote may be associated with a tote identifier. A user of user device 303 may input the tote identifier associated with the tote containing the inbound product for stowing in interface 600. Once the user inputs the tote identifier, one or more processors 305 of user device 303 may send the tote identifier to one or more processors 301 of warehouse management system 119. As such, one or more processors 301 may receive the tote identifier from one or more processors 305 of user device 303.

After receiving the tote identifier, method 800 may proceed to block 807. At block 807, one or more processors 301 may be configured to modify database 304 to assign the product identifier associated with the inbound product contained in the tote and the tote identifier to the predicted zone. As such, one or more processors 301 may maintain an inventory, in database 304, of each tote and product that is stowed in each zone within FC 200.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for receiving inbound products, the system comprising:
    a memory storing instructions; and
    at east one processor configured to execute the instructions to:
        schedule a delivery of an inbound pallet based on a predetermined priority rule, the inbound pallet comprising at least two products;
        modify a database to assign an inbound barcode to the inbound pallet;
        receive, from a user mobile device, data in one format or protocol;
        convert the received data into another format or protocol, wherein the converted data comprises a location of the user mobile device and the inbound barcode;
        assign a pallet priority level of the inbound pallet, wherein the pallet priority level is assigned based on a weight of a product priority level of a product identifier associated with each of the at least two products;
        provide a notification to the user mobile device to stow the inbound pallet within a timeframe based on the assigned pallet priority level;
        predict a zone proximate the location of the user mobile device for stowing at least one product of the at least two products and a stowing capacity of the zone, wherein the prediction is based on the product priority level of the product identifier associated with the at least one product; and
        modify the database to assign the product identifier to the zone for stowing the at least one product at the zone.

2. The system of claim 1, wherein the prediction is based on the product priority level of the product identifier and a parameter associated with the product identifier.

3. The system of claim 2, wherein the parameter comprises at least one of a dimension of the product associated with the product identifier, a weight of the product associated with the product identifier, or an expiration date of the product associated with the product identifier.

4. The system of claim 1, wherein the product pallet priority level of the inbound pallet includes a first priority level, a second priority level, or a third priority level.

5. The system of claim 4, wherein, when the pallet priority level is associated with the first priority level, the timeframe is within a predetermined number of hours from receiving the inbound pallet.

6. The system of claim 4, wherein, when the pallet priority level is associated with the second priority level, the timeframe within one day from receiving the inbound pallet.

7. The system of claim 4, wherein, when the pallet priority level is associated with the third priority level, the timeframe is within a predetermined number of days from receiving the inbound pallet.

8. The system of claim 4, wherein the at least one processor is further configured to execute the instructions to modify the database to assign an expected delivery date and a timestamp of the inbound pallet.

9. The system of claim 4, wherein the at least one processor is further configured to execute the instructions to:
    receive, from the user mobile device, a report of an inbound error associated with the product, the report comprising an inbound error barcode; and modify the database to assign the inbound error barcode to the product identifier associated with the product.

10. The system of claim 9, wherein the inbound error barcode is mapped to the inbound error such that, when the inbound error barcode is scanned, the at least one processor is configured to display, on the user mobile device, a cause of the inbound error.

11. A computer-implemented method for receiving inbound products, the method comprising:
    scheduling a delivery of an inbound pallet based on a predetermined priority rule, the inbound pallet comprising at least two products;
    modifying a database to assign an inbound barcode to the inbound pallet;
    receiving, from a user mobile device, data in one format or protocol;
    converting the received data into another format or protocol, wherein the converted data comprises a location of the user mobile device and the inbound barcode;
    assigning a pallet priority level of the inbound pallet, wherein the pallet priority level is assigned based on a weight of a product priority level of a product identifier associated with each of the at least two products;
    providing a notification to the user mobile device to stow the inbound pallet within a timeframe based on the assigned pallet priority level;
    predicting a zone proximate the location of the user mobile device for stowing at least one product of the at least two products and a stowing capacity of the zone, wherein the prediction is based on the product priority level of the product identifier associated with the at least one product; and
    modifying the database to assign the product identifier to the zone for stowing the at least one product at the zone.

12. The method of claim 11, wherein the prediction is based on the product priority level of the product identifier and a parameter associated with the product identifier.

13. The method of claim 12, wherein the parameter comprises at least one of a dimension of the product associated with the product identifier, a weight of the product associated with the product identifier, or an expiration date of the product associated with the product identifier.

14. The method of claim 11, wherein the pallet priority level of the inbound pallet includes a first priority level, a second priority level, or a third priority level.

15. The method of claim 14, wherein the timeframe is within a predetermined number of hours from receiving the inbound pallet when the pallet priority level is associated with the first priority level.

16. The method of claim 14, wherein the timeframe is within one day from receiving the inbound pallet when the pallet priority level is associated with the second priority level.

17. The method of claim 14, wherein the timeframe is within a predetermined number of days from receiving the inbound pallet when the pallet priority level is associated with the third priority level.

18. The method of claim 14, further comprising modifying the database to assign an expected delivery date and a timestamp of the inbound pallet.

19. The method of claim 14, further comprising:
receiving, from the user mobile device, a report of an inbound error associated with the product, the report comprising an inbound error barcode; and modifying the database to assign the inbound error barcode to the product identifier associated with the product.

20. A non-transitory computer-readable medium storing instructions that, when executed by at least one processor, cause the at least one processor to perform steps, comprising:

scheduling a delivery of an inbound pallet based on a predetermined priority rule, the inbound pallet comprising at least two products;
modifying a database to assign an inbound barcode to the inbound pallet;
receiving, from a user mobile device, data in one format or protocol;
converting the received data into another format or protocol, wherein the converted data comprises a location of the user mobile device and the inbound barcode;
assigning a pallet priority level of the inbound pallet, wherein the pallet priority level is assigned based on a weight of a product priority level of a product identifier associated with each of the at least two products;
providing a notification to the user mobile device to stow the inbound pallet within a timeframe based on the assigned pallet priority level;
predicting a zone proximate the location of the user mobile device for stowing at least one product of the at least two products and a stowing capacity of the zone, wherein the prediction is based on the product priority level of the product identifier associated with the at least one product; and
modifying the database to assign the product identifier to the zone for stowing the at least one product at the zone.

* * * * *